United States Patent
Bohl et al.

(10) Patent No.: US 11,085,844 B2
(45) Date of Patent: Aug. 10, 2021

(54) MEDIA-SEPARATED PRESSURE TRANSMITTER

(71) Applicant: TDK Electronics AG, Munich (DE)

(72) Inventors: Benjamin Bohl, Berlin (DE); Jan Ihle, Raaba-Grambach (AT); Bert Hundertmark, Stahnsdorf (DE); Bernd Polder, Berlin (DE); Christian Wohlgemuth, Berlin (DE)

(73) Assignee: TDK ELECTRONICS AG, Munich (DE)

( * ) Notice: Subject to any disclaimer, the term of this patent is extended or adjusted under 35 U.S.C. 154(b) by 0 days.

(21) Appl. No.: 16/650,324

(22) PCT Filed: Sep. 27, 2018

(86) PCT No.: PCT/EP2018/076316
§ 371 (c)(1),
(2) Date: Mar. 24, 2020

(87) PCT Pub. No.: WO2019/063715
PCT Pub. Date: Apr. 4, 2019

(65) Prior Publication Data
US 2020/0271534 A1    Aug. 27, 2020

(30) Foreign Application Priority Data
Sep. 28, 2017  (DE) .......................... 102017122607.9

(51) Int. Cl.
*G01L 19/00*    (2006.01)
*G01L 19/04*    (2006.01)
*G01L 19/14*    (2006.01)

(52) U.S. Cl.
CPC .......... *G01L 19/0046* (2013.01); *G01L 19/04* (2013.01); *G01L 19/147* (2013.01)

(58) Field of Classification Search
None
See application file for complete search history.

(56) References Cited

U.S. PATENT DOCUMENTS

| | | |
|---|---|---|
| 7,124,640 B1 | 10/2006 | Miller et al. |
| 7,946,178 B2 | 5/2011 | Hanselmann et al. |
| 8,234,926 B2 | 8/2012 | Wohlgemuth et al. |
| 2006/0048580 A1 | 3/2006 | Vogler |
| 2006/0070447 A1 | 4/2006 | Agami |
| 2006/0289415 A1 | 12/2006 | Muehlheim et al. |

(Continued)

FOREIGN PATENT DOCUMENTS

| | | |
|---|---|---|
| CN | 102519658 A | 6/2012 |
| CN | 105352651 A | 2/2016 |

(Continued)

*Primary Examiner* — Lisa M Caputo
*Assistant Examiner* — Nigel H Plumb
(74) *Attorney, Agent, or Firm* — Slater Matsil, LLP

(57) ABSTRACT

A pressure transmitter is disclosed. In an embodiment a pressure transmitter includes a housing including a housing wall, a sensor element arranged inside the housing, a ceramic substrate acting as a carrier of the sensor element and of its electrical connection arranged inside the housing and a first heating element arranged inside the housing or the housing wall, wherein the pressure transmitter is configured to determine differential, relative or absolute pressure.

18 Claims, 1 Drawing Sheet

(56) References Cited

U.S. PATENT DOCUMENTS

| | | | |
|---|---|---|---|
| 2011/0083513 A1* | 4/2011 | Wohlgemuth | G01L 19/0046 73/716 |
| 2011/0132096 A1 | 6/2011 | Ricks | |
| 2014/0001578 A1 | 1/2014 | Walchli et al. | |
| 2017/0038273 A1 | 2/2017 | Krauss et al. | |

FOREIGN PATENT DOCUMENTS

| | | |
|---|---|---|
| DE | 102008049143 A1 | 4/2010 |
| DE | 102014207480 A1 | 10/2015 |
| JP | S5776431 A | 5/1982 |
| JP | H02124527 U | 10/1990 |
| JP | 2006170851 A | 6/2006 |
| JP | 2009058366 A | 3/2009 |
| JP | 4563312 B2 | 10/2010 |
| JP | 4712220 B2 | 6/2011 |
| JP | 2012189349 A | 10/2012 |
| WO | 2008154760 A1 | 12/2008 |
| WO | 2009132981 A1 | 11/2009 |
| WO | 2012129711 A1 | 10/2012 |

* cited by examiner

MEDIA-SEPARATED PRESSURE TRANSMITTER

This patent application is a national phase filing under section 371 of PCT/EP2018/076316, filed Sep. 27, 2018, which claims the priority of German patent application 102017122607.9, filed Sep. 28, 2017, each of which is incorporated herein by reference in its entirety.

TECHNICAL FIELD

The invention relates to media-separated pressure transmitter for use in aggressive, freezing or highly viscous media.

BACKGROUND

During the measurement of pressure by means of pressure sensors in media under relatively difficult or extreme conditions, it happens that condensate or freezing or highly viscous media vitiate the measurement signal of the pressure sensors used. Such media may inter alia be hot, viscous, thin cold, aqueous or oily phases, cold thick oils, frozen water or fuel. The consequences of a vitiated measurement may be insufficient exhaust gas purification, engine damage or generally damage to other elements of a process to be monitored. Because of an increased requirement for exhaust gas purification of internal combustion engines, it is, for example, necessary to carry out precise pressure measurement 20 in various media directly after a cold engine start.

SUMMARY OF THE INVENTION

Embodiments provide a pressure sensor which avoids the problems mentioned above and, for example, can already carry out a correct pressure measurement in an engine-relevant medium at a time close to a cold engine start, and can increase the lifetime of the pressure sensor. In particular, the pressure sensor is intended to be suitable for measuring the pressure of aggressive media.

Further embodiments provide a pressure transmitter, with which it is possible to measure a differential, relative or absolute pressure. It comprises a housing, which in turn comprises a housing wall. The housing wall may be sealed for a measurement of the absolute pressure, or may contain openings for a measurement of a relative pressure or differential pressure, for example, in order to use atmospheric conditions as a reference pressure. The following are arranged in the housing: a sensor element, a ceramic substrate and a pressure connection fitting.

The sensor element is a component with which a pressure-induced deflection of a membrane is determined. It may be configured in various technical variants: for example, a direct pressure determination by using the piezo effect or by means of measuring the extent of the membrane, for example, with the aid of resistive elements.

For the orientation of the sensor element, in what follows the side of the sensor element on which the membrane is located is referred to as the upper side of the sensor element, and the opposite side is referred to as the lower side of the sensor element. On the lower side, there is a media access in the sensor element, which makes the membrane accessible on the lower side for the medium carrying the pressure. The sensor element may be configured as an MEMS component.

The ceramic substrate is used as a carrier for the sensor element and its electrical connection. The electrical connection may be arranged on the upper side of the ceramic substrate, and is used to conduct a measurement signal from the pressure sensor, where it is externally processed and where a pressure is assigned to the measurement signal.

For measurement of absolute pressure, the medium access of the sensor element through the ceramic substrate is closed, or the sensor element is focused on the rear side. On the ceramic substrate, the sensor element is fitted in a recess which is covered by a membrane. The upper side of the sensor element, the recess in the ceramic substrate and the membrane in this case enclose a cavity, which is filled with oil. The ceramic substrate, the membrane and the oil form a transmitter unit, which protects the sensor element from aggressive media and transmits the pressure of the medium in the system to be monitored to the sensor element.

Arranged on the transmitter unit is the pressure connection fitting, for example, from metal, in which a medium that is sometimes aggressive is delivered to the membrane. The pressure connection fitting is fastened over the membrane on the recess and protrudes through the housing wall, so that it can be connected directly to the system to be monitored or to the media-carrying system. For measurement of differential pressure, a second transmitter unit and a second pressure connection fitting may be fitted on the lower side of the sensor element.

If, in another example, the relative pressure with respect to the atmosphere is intended to be measured, the housing thus contains an opening and the media access, arranged on the lower side, of the sensor element is not blocked by the ceramic substrate or lower-side closure of the sensor element, as in the case of absolute pressure measurement.

Furthermore, a heating element is part of the pressure transmitter. It may be fitted at various positions in the pressure transmitter, with the purpose of reaching an operating temperature that allows exact measurement in the pressure sensor. By the heating of the pressure transmitter, possible solid and liquid condensates are melted, and possibly evaporated, and driven or heated out from the pressure transmitter together with any highly viscous media that may be present. With the heating element, it is also possible to prevent formation of ice crystals which may damage or destroy the sensor element.

The heating element is, for example, configured to heat the pressure transmitter to a temperature significantly above the freezing point. For example, heating to a temperature of between 20° C. and 50° C., in particular up to 160° C., is provided.

The various possible positions for the heating element all lie inside the pressure sensor, and exemplary positions are mentioned below in an inexhaustive list:

the heating element may be arranged on or in the ceramic substrate (positions A and B), in which case the heating element is preferably in the vicinity of the electrical connections. The ceramic substrate may also be configured as a laminating ceramic. The heating element may, for example, be pressed onto a layer inside or on a surface of the ceramic substrate;

in the housing, for example, internally on the housing wall (position C), the heating element being in direct contact with components of the housing by adhesive bonding, pumping or soldering;

inside the housing wall (position D); and on the pressure connection fitting (position E), the heating element covering an outer section of the pressure connection fitting. The heating element may also be integrated into the gel boundary.

The various embodiments of the heating element may comprise: a conductive plastic, a resistor formed, for example, as a meander or a resistor having a positive temperature coefficient. The advantage of a possible meandering shape of the resistor is that the resistor is longer and consequently has a higher value, which leads to a higher heating power. With the use of a resistor having a positive temperature coefficient, external regulation of a heating power of the heating element is no longer necessary.

In another embodiment, the heating element is integrated into the housing of the sensor and is configured in such a way that it can generate and emit microwaves, with which, according to choice, the entire pressure sensor, individual pails thereof or the media to be measured are heated. In this way, the heating takes place directly at the desired position and, for example, in the medium, and the heating power applied can be used more optimally. Such a heating system may also be arranged at a different location of the sensor.

Supplying the heating element with electricity may be carried out in various ways. In this case, for example, there is the possibility of the electrical feed of the pressure sensor, but also the variant of an additional electricity supply independent of the sensor element. Separation of the energy supply has the advantage that the electrical feed to the heating element does not interfere with the measurement signals.

Besides the heating element described, the pressure sensor may comprise a further heating element in one of the designs explained. This may be fitted at one of the positions described, but also at a position different to the position of the first heating element. By the use of a plurality of heating elements, the pressure sensor can be heated more homogeneously and therefore more efficiently.

The pressure transmitter described above is, for example, configured for use in a motor vehicle, in particular for a use in the exhaust gas region of a motor vehicle, for example, in the region of a diesel particle sensor or of a urea sensor.

According to another aspect of the invention, a method for operating the pressure transmitter described above is provided. According to the method, during start-up of the pressure transmitter, the heating element is turned on in order to heat the pressure transmitter until an established operating temperature is reached. At the established operating temperature, a first pressure measurement is carried out. The heating element is turned on heating as little as possible during operation of the pressure transmitter in order to reduce the energy consumption. For example, the heating element is turned off when the operating temperature is reached. Freezing of the pressure transmitter is subsequently prevented by the engine heat. As an alternative, continuous operation of the heating element is also possible, in order to prevent freezing during driving.

BRIEF DESCRIPTION OF THE DRAWINGS

The invention and its component parts will be explained in more detail below with the aid of a selection of exemplary embodiments and the associated schematic figures.

DETAILED DESCRIPTION OF ILLUSTRATIVE EMBODIMENTS

Figure 1:
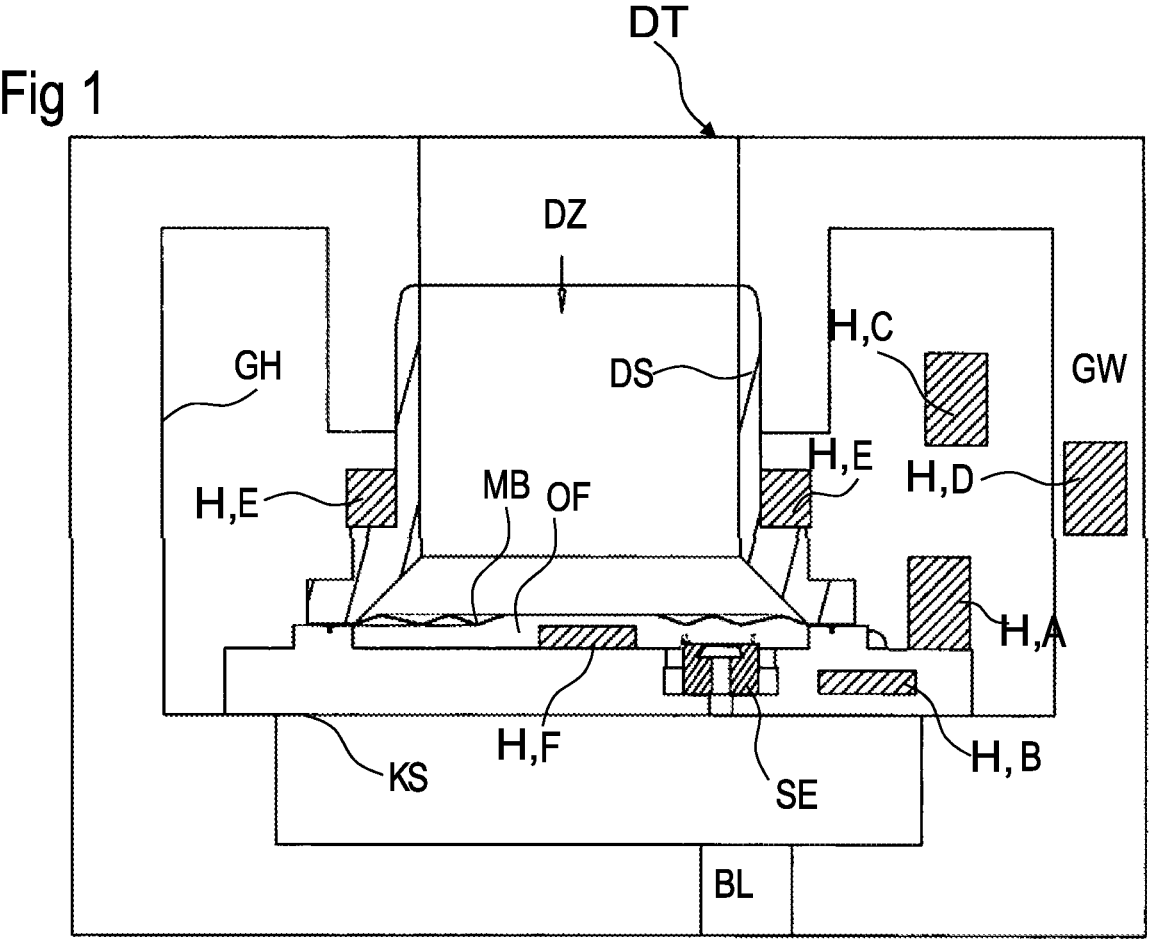
FIG. 1 shows a schematic cross section of a pressure transmitter with various positions for one or more heating elements and their relationship relative to other component parts of the pressure transmitter.

The sectional view shown in FIG. 1 shows the schematic structure of a pressure transmitter DT. It comprises a housing GH, comprising a housing wall GW, a ceramic substrate KS arranged inside the housing, a sensor element SE embedded in the ceramic substrate, a membrane MB, and a pressure connection fitting DS. The sensor element is located in a recess on the ceramic substrate, which recess is covered by the membrane MB. Provided between the upper side of the sensor element, the ceramic substrate and the membrane, there is a cavity which is filled with oil OF. The pressure connection fitting DS, through which the medium is delivered to the membrane MB, is fitted over the membrane.

Furthermore, a plurality of different variants for the possible positioning of one or more heating elements H, in particular at positions A to F, is indicated. The exemplary fitting locations indicated for the heating element are as follows; the heating element may be arranged in or on the ceramic substrate (positions A and B), in the housing, for example internally on the housing wall (position C), inside the housing wall (position D), on the pressure connection fitting (position E), or in the recess in the oil on the ceramic substrate (position F).

All representations of the heating element and its possible positions are purely schematic and are not in proportion to one another or to the size of the respectively represented components.

Figure 2:
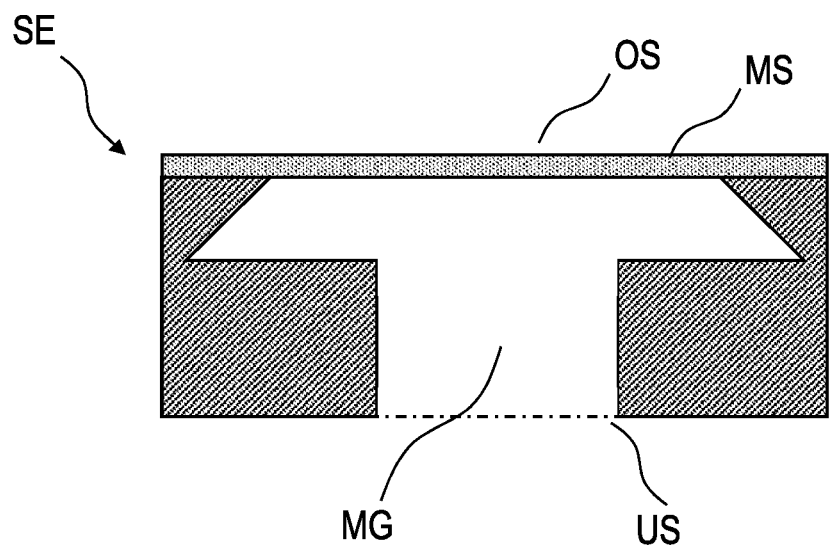
FIG. 2 shows the schematic cross section of a sensor element.

FIG. 2 shows an enlarged sectional view of the sensor element SE. In this case, a membrane of the sensor element MS can be seen, which in this case forms the upper side OS of the sensor element. Opposite the upper side, a media access MG from below to the membrane of the sensor element MS is arranged on the lower side US of the sensor element.

The form of a sensor element as represented in FIGS. 1 and 2 is only exemplary and schematic. Other forms or materials may also be used in order to design a pressure transmitter element.

The invention claimed is:

1. A pressure transmitter comprising:
   a housing comprising a housing wall;
   a sensor element arranged inside the housing;
   a ceramic substrate acting as a carrier of the sensor element and of its electrical connection arranged inside the housing; and
   a first heating element arranged inside the housing or the housing wall,
   wherein the sensor element is arranged in a transmitter unit, which is configured as a recess in the ceramic substrate and is covered by a membrane,
   wherein a resulting cavity is filled with oil,
   wherein the first heating element is arranged in the oil of the transmitter unit, and
   wherein the pressure transmitter is configured to determine differential, relative or absolute pressure.

2. The pressure transmitter according to claim 1, wherein the first heating element is arranged on or in the ceramic substrate.

3. The pressure transmitter according to claim 1, wherein the first heating element is arranged inside the housing.

4. The pressure transmitter according to claim 1, wherein the first heating element is arranged inside the housing wall.

5. The pressure transmitter according to claim 1, further comprising a pressure connection fitting located over the membrane.

6. The pressure transmitter according to claim 1, wherein the first heating element comprises an electrically conductive plastic.

7. The pressure transmitter according to claim 1, wherein the first heating element comprises a resistive element having a positive temperature coefficient.

8. The pressure transmitter according to claim 1, wherein the first heating element is integrated into parts of the housing wall and is configured to generate microwave radiation.

9. The pressure transmitter according to claim 1, wherein the first heating element is equipped with an electricity supply separated from the pressure transmitter.

10. The pressure transmitter according to claim 1, wherein the sensor element is a MEMS component.

11. The pressure transmitter according to claim 1, further comprising a second heating element arranged at a different location than the first heating element.

12. The pressure transmitter according to claim 1, wherein the pressure transmitter is configured to measure a pressure during an engine cold start in a motor vehicle, wherein the first heating element is configured to heat the pressure transmitter to an established operating temperature at which a first pressure measurement is performable.

13. The pressure transmitter according to claim 1, wherein the first heating element is configured to heat the pressure transmitter to a temperature between 20° C. and 160° C. inclusive.

14. A method for operating the pressure transmitter according to claim 1, the method comprising:

turning on the first heating element during a start-up of the pressure transmitter; and heating the pressure transmitter until an operating temperature is reached.

15. The method according to claim 14, further comprising turning off the first heating element when the operating temperature is reached.

16. A pressure transmitter comprising:

a housing comprising a housing wall;

a transmitter comprising a recess in a ceramic substrate, a cavity filled with oil and a membrane covering the recess, wherein the transmitter is arranged inside the housing, a sensor located inside the recess, wherein the ceramic substrate is configured to act as a carrier of the sensor and of its electrical connection; and a first heater arranged inside the housing, wherein the first heater is arranged in the oil of the transmitter, and wherein the pressure transmitter is configured to determine differential, relative or absolute pressure.

17. The pressure transmitter according to claim 16, wherein the first heater is arranged on or in the ceramic substrate.

18. The pressure transmitter according to claim 16, further comprising a second heating element arranged at a different location than the first heating element.

* * * * *